(12) United States Patent
Keller

(10) Patent No.: US 8,690,743 B2
(45) Date of Patent: Apr. 8, 2014

(54) BEARING ARRANGEMENT AND ROLLING UNIT FOR A ROLLING-MILL ROLL

(75) Inventor: Karl Keller, Hilchenbach (DE)

(73) Assignee: SMS Siemag Aktiengesellschaft, Duesseldorf (DE)

(*) Notice: Subject to any disclaimer, the term of this patent is extended or adjusted under 35 U.S.C. 154(b) by 0 days.

(21) Appl. No.: 13/996,021

(22) PCT Filed: Dec. 19, 2011

(86) PCT No.: PCT/EP2011/073201
§ 371 (c)(1),
(2), (4) Date: Jul. 31, 2013

(87) PCT Pub. No.: WO2012/084791
PCT Pub. Date: Jun. 28, 2012

(65) Prior Publication Data
US 2013/0324384 A1 Dec. 5, 2013

(30) Foreign Application Priority Data
Dec. 23, 2010 (DE) .......................... 10 2010 064 102

(51) Int. Cl.
*B21B 27/02* (2006.01)
*F16C 13/00* (2006.01)
*B23P 11/00* (2006.01)
*B21D 53/10* (2006.01)
*F16C 43/04* (2006.01)

(52) U.S. Cl.
USPC ............. 492/1; 492/15; 29/895.2; 29/898.07; 29/525.11; 384/295; 384/562; 384/584

(58) Field of Classification Search
CPC ..... B21B 31/07; B21B 27/035; F16C 35/073; F16C 17/02; F16C 35/06; F16C 35/063; F16C 35/07; F16C 33/08; F16L 21/05; F16L 21/08; B25B 27/06; B25B 27/062
USPC ............... 492/1, 15, 60; 20/895–895.33, 428, 20/525.01, 525.02, 525.03, 525.11, 898, 20/898.07, 898.09; 384/126, 276, 295, 384/562, 584
See application file for complete search history.

(56) References Cited

U.S. PATENT DOCUMENTS 3,782,796 A * 1/1974 Rickley et al. ............... 384/584
3,799,636 A 3/1974 Kersting
(Continued)

FOREIGN PATENT DOCUMENTS

DE 102006024136 11/2007

*Primary Examiner* — Sarang Afzali
(74) *Attorney, Agent, or Firm* — Abelman, Frayne & Schwab

(57) ABSTRACT

The invention relates to a bearing arrangement and a rolling unit for a rolling-mill roll. The bearing arrangement comprises a bearing housing, a bearing bush (120) rigidly installed in the bearing housing, a journal bush (130) rotatably supported in the bearing bush, a bearing device (140) for the roll journal, and a pressure shoulder ring arranged between the journal bush (130) and the bearing device (140). At least one key (150) is used to connect both the journal bush and the pressure shoulder ring (135) to the roll journal of the rolling mill roll in a rotationally rigid manner. In order to further develop such a known bearing arrangement for a rolling-mill roll and a known rolling unit so that it is easier to remove the bearing arrangement from the roll journal, the bearing arrangement according to the invention has a coupling device between the journal bush (130) and the pressure shoulder ring (135) without or with only low stress.

8 Claims, 2 Drawing Sheets

(56) References Cited

U.S. PATENT DOCUMENTS

| | | | |
|---|---|---|---|
| 3,851,365 A * | 12/1974 | Oxlade | 492/1 |
| 4,093,321 A | 6/1978 | Ikarishi | |
| 5,211,487 A * | 5/1993 | Hannon et al. | 384/562 |
| 6,132,101 A * | 10/2000 | Landy, III | 384/559 |
| 7,386,939 B2 * | 6/2008 | Di Giacomo | 29/898.07 |
| 8,037,585 B2 | 10/2011 | Keller | |
| 2009/0116774 A1 | 5/2009 | Keller | |
| 2011/0232351 A1 | 9/2011 | Keller | |

* cited by examiner

BEARING ARRANGEMENT AND ROLLING UNIT FOR A ROLLING-MILL ROLL

The invention relates to a bearing arrangement for a rolling mill roll and a rolling unit. Bearing arrangements for a rolling mill roll are basically known in the state-of-the art. Typically, they includes a bearing housing, a bearing bush fixedly mounted in the bearing housing, a journal bush rotatably supported in the bearing bush, a bearing device for the roll journal of the rolling mill roll, and a pressure shoulder ring located between the journal bush and the bearing device. At least the journal bush is connected by a key with the roll journal. Finally, a typical bearing arrangement includes a nut screwable on an extension of the roll journal for securing the bearing arrangement against an axial displacement.

Such a bearing arrangement is disclosed, e.g., in German Laid-Open Application DE 26 12 744 or in EP 1 871 549 A1. In those arrangements, either only the journal bush or only the pressure shoulder ring is secured by a key with the roll journal for joint rotation therewith. The fixed connection of either of the pressure shoulder ring and the journal bush when it is not secured to the roll journal by a key, is effected in those disclosures by a screw connection acting between the pressure shoulder ring and the journal bush. The screw that provides the screw connection should, in this case, be tightened with such a large torque that as a result, a friction connection, and thus, a large stress develops between the pressure shoulder ring and the journal bush, so that no relative movement is possible between the journal bush and the pressure shoulder ring.

The drawback of such connection consists in that the screw or screws is (are) very heavily loaded, so that the connection of the journal bush with the screwed pressure shoulder moves axially away off the cone under radial load applied to the bearing during rotation of the roll. The axial load causes bending of the screw, while the journal bush not only moves axially but also simultaneously is subjected to a radial necking.

In order to prevent these screw connection loads, the bearing arrangement disclosed in WO 2007/134655 A2 includes a key that connects both the journal bush and the pressure shoulder ring with the roll journal for joint rotation therewith. The screw connection between the pressure shoulder ring and the journal bush for preventing the displacement or rotation of the at least the pressure shoulder ring relative to the roll journal is not any more necessary with the contemplated arrangement because of provision of the key connection.

Proceeding from this state-of-the art, the object of the invention is to so modify the known bearing arrangement and the rolling unit for a rolling mill roll that dismounting of the journal bush from a roll journal of a rolling mill roll is simplified.

With regard to the bearing arrangement, this object is achieved by the subject matter of claim 1. This one is characterized by provision of at least one coupling element for coupling the journal bush to the pressure shoulder ring without or only with low stress between the journal bush and the pressure shoulder ring.

At least one key which is provided in the bearing arrangement according to the present invention, insures connection of both the journal bush and the pressure shoulder ring with the roll journal for joint rotation therewith. Because the coupling element between the journal bush and the pressure shoulder ring is not any more mechanically loaded during operation of the rolling mill roll, it should not prevent, in particular, the relative movement between the journal bush and the pressure shoulder ring. It is so formed according to the invention that either no or only a small stress is generated between the journal bush and the pressure shoulder ring. In particular, the coupling element itself is not mechanically loaded during the rolling operation.

The inventive coupling element, which forms a connection between the journal bush and the pressure shoulder ring, serves advantageously as a driver for pulling the journal bush with the aid of pressure shoulder ring when the pressure shoulder ring works as a piston during its dismounting from the roll journal and is subjected to the action of the pressure medium. In this case, the journal bush, together with the pressure shoulder ring, can be pulled in the axial direction off the roll journal.

According to a first embodiment, the coupling element is formed as a screw for providing a screw connection without or only with only a low stress between the roll journal bush and the pressure shoulder ring.

The term "stress" within the frame of the present invention means that the stress is smaller than the stress generated when the screw is tightened with a nominal torque, and the journal bush and the pressure shoulder ring would be correspondingly stressed.

A screw shaft extends through a bore in the pressure shoulder ring and is screwed into the journal bush. Screwing in the pressure shoulder ring is not necessary. According to a further embodiment of the invention, the shaft has a rear portion preferably without a thread, extending between the screw head and the threaded portion and having a length which is greater than a depth of the bore in the pressure shoulder ring. By providing a rear portion of the screw shaft with the claimed length, it is insured that the stress between the pressure shoulder ring and the journal bush is prevented at least to a substantial degree. Besides, in this way, an unnecessary loading of the screw is prevented.

According to the invention, advantageously, screw-locking means is provided to prevent loosening of the screw in particular during the rolling operation in mill roll. This can result in damage in the bearing arrangement.

Different possibilities for realization of screw locking form subject matter of the dependent claims.

The above-mentioned object of the invention is further achieved by providing a rolling unit. The advantages of the rolling unit correspond to advantages mentioned with respect to the bearing arrangement.

The specification is accompanied by four drawing figures, wherein:

The invention will be described in detail below with reference the above-mentioned drawing figures. In all of the figures the same technical elements are designated with the same reference numerals.

FIG. 1 shows a half of the inventive rolling unit, wherein the rolling unit includes a rolling mill roll 200 with a roll journal 210 and a bearing arrangement according to the present invention and associated with the roll journal.

Figure 1:
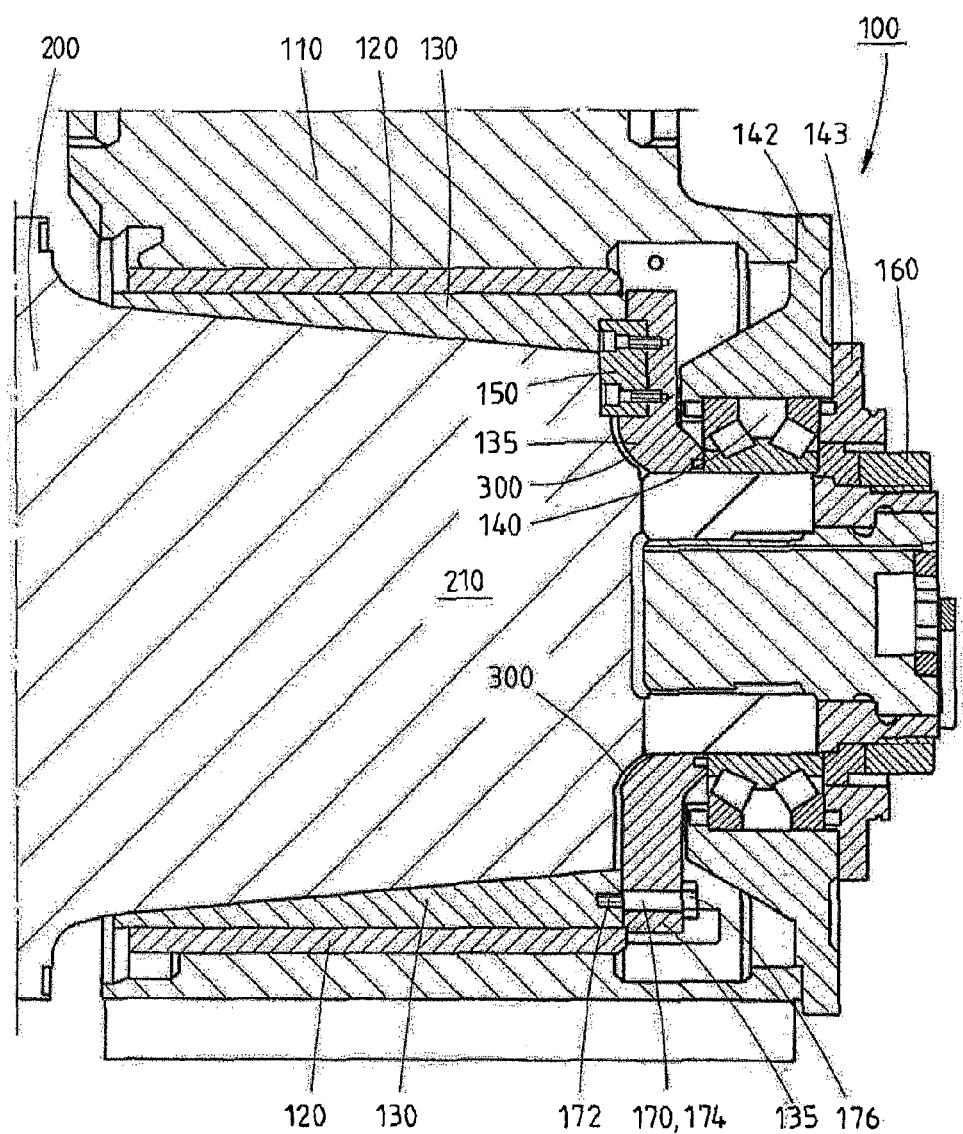
FIG. 1 shows the inventive bearing arrangement and the inventive rolling unit.

The bearing arrangement includes a bearing housing 110 also called as an insert, and a bearing bush 120 mounted in the bearing housing. A journal bush 130 is rotatably supported in the bearing bush. The bearing arrangement further includes a bearing device 140, i.e., usually a ball or roller bearing for the roll journal 210 and a pressure shoulder ring 135 located between the journal bush 130 and the bearing device 140. With the inventive arrangement, at least one key 150 is provided for connecting of both the journal bush and the pressure shoulder ring with the roll journal without a possibility of relative rotation therebetween. Alternatively, two keys can be provided for individual connection of the journal bush 130 and the pressure shoulder ring 135 with the roll journal 210, respectively, without the possibility of the relative rotation therebetween. A nut screwable on a heel of the roll journal serves for securing the bearing arrangement against axial displacement. Generally, during a rolling process, axial forces are produced which tend to displace the bearing arrangement, in particular the journal bush in the axial direction away form the roll cylinder. This is prevented by a form-locking support of the journal bush against the nut 160 by the pressure shoulder ring and the bearing device 140.

According to the invention, in addition to the key, there is provided a screw as coupling means between the journal bush and the pressure shoulder ring, wherein the screw connection, however, is formed without or only with a low stress.

Figure 2:
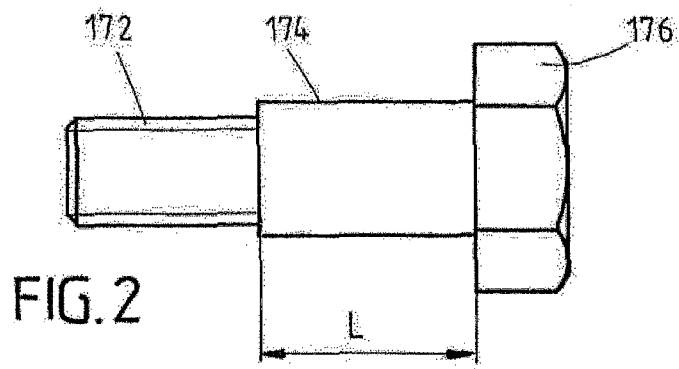
FIG. 2 shows the inventive screw.

As shown in FIG. 1, the screw extends through a bore in the pressure shoulder ring 135, with its threaded portion 172 screwed into the journal bush 130. A portion 174 of the screw which extends between the screw head 176 and the threaded portion 172 is formed, preferably, without a thread and has a length L that at least corresponds to the depth of the bore in the pressure shoulder ring 135, see FIG. 2. The specific formation of the screw insures that basically no stress is generated between the pressure shoulder ring and the journal bush 130, in particular, when an air gap remains between the screw head and the bearing surface of the pressure shoulder ring as shown, e.g., in FIG. 1. In this case, upon tightening of the screw with a nominal torque, stress between the pressure shoulder ring 135 and the journal bush 130 is not possible.

Figure 3:
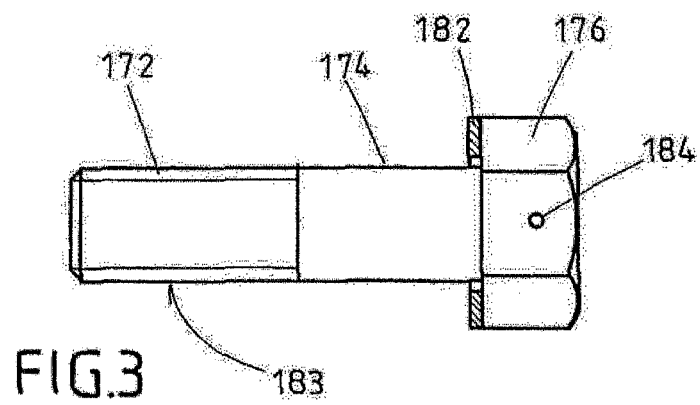
FIG. 3 shows the inventive screw with a first embodiment of screw-locking means.

FIG. 3 shows different possibilities of securing the screw against loosening. Thus, e.g., glue 183 can be applied to the threaded portion 172 during screwing of the screw in the journal bush. To the same end, a washer 182 can serve, which is formed of a resilient material or as a spring washer. Further, the screw locking can be effected with a wire 184 extending through a bore in the screw head and secured, e.g., on the pressure shoulder ring.

Figure 4:
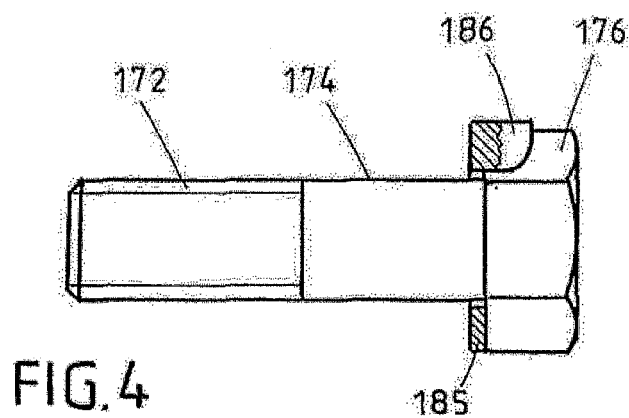
FIG. 4 shows the inventive screw with a further embodiment of the screw-locking means.

According to FIG. 4, the screw locking is provided in form of a washer 135 formed of soft steel in connection with plastically deformable noses 146 provided on the screw head and which engage the soft steel washer by being bent thereover.

Alternatively to a screw, a coupling element can be arbitrarily formed, e.g., in form of a double hook. The important thing is that the coupling element is so formed that an axial force that acts on the pressure shoulder ring in a direction away from the roll cylinder is transmitted to the journal bush. In this way, the coupling element is in a position to serve as a driver for picking up the journal bush when the pressure shoulder ring is pulled in the axial direction from the roll journal.

LIST OF REFERENCE NUMERALS

100 Bearing arrangement
110 Bearing housing
120 Bearing bush
130 Journal bush
135 Pressure shoulder ring
140 Bearing device
142 Cover
143 Screw-locking means
150 Key
160 Nut
170 Screw
172 Threaded portion
174 Intermediate portion
176 Screw head
182 Washer
183 Glue
184 Wire
186 Deformable nose
200 Rolling mill roll
210 Roll journal
300 Intermediate Space

The invention claimed is:

1. A bearing arrangement (100) for a rolling mill roll (200) having a roll journal (210), the bearing arrangement comprising:
   a bearing housing (110);
   a bearing bush (120) fixedly mounted in the bearing housing;
   a journal bush (130) rotatably supported in the bearing bush;
   a bearing device (140) for the roll journal;
   a pressure shoulder ring (135) located between the journal bush (130) and the bearing device (140);
   at least one key (150) for connecting the journal bush (130) and the pressure shoulder ring (135) with the roll journal (210) of the rolling mill roll for joint rotation therewith;
   a nut (160) screwable on the roll journal for securing the bearing arrangement against an axial displacement; characterized by
   at least one coupling element (170) for coupling the journal bush (130) to the pressure shoulder ring (135) formed as a screw for providing a screw connection without or only with low stress between the roll journal and the pressure shoulder ring, wherein a screw shaft extends through a bore having a depth in the pressure shoulder ring (135) and is screwed with a threaded portion into the journal bush (135), and the shaft of the screw has a rear portion (174) without a thread extending between the screw head (176) and the threaded portion (172) and having a length (L) which is greater than the depth of the bore in the pressure shoulder ring, wherein the at least one coupling element (170) is not mechanically loaded during a rolling operation.

2. A bearing arrangement (100) according to claim 1, characterized by screw-locking means for securing the screw (170) against an inadvertent loosening.

3. A bearing arrangement (100) according to claim 2, characterized in that the screw-locking means is formed of a washer (182) for the screw, wherein the washer is formed of resilient material or as a spring ring.

4. A bearing arrangement (100) according to claim 2, characterized in that the screw locking means is in form of glue (183) that is applied to the threaded portion (172) when the screw is screwed into the journal bush (130).

5. A bearing arrangement according to claim 2, characterized in that the screw-locking means is formed as a wire (184) extending, among others, through the screw head (176).

6. A bearing arrangement (100) according to claim 2, characterized in that the screw-locking means is formed as a washer (182) of soft steel in combination with plastically deformable noses (186) provided on the screw head and engaging the washer of soft steel by bending thereover.

7. A bearing arrangement (100) according to claim 1, characterized in that a gap between the screw head (176) and the bearing surface of the pressure shoulder ring (135) remains even after tightening the screw.

8. A rolling unit, comprising: a rolling mill roll (200) with two roll journals (210); and two bearing arrangements (100) for receiving, respectively, one of the two journals, with each bearing arrangement comprising:

- a bearing housing (110);
- a bearing bush (120) fixedly mounted in the bearing housing;
- a journal bush (130) rotatably supported in the bearing bush;
- a bearing device (140) for the roll journal;
- a pressure shoulder ring (135) located between the journal bush (130) and the bearing device (140);
- at least one key (150) for connecting the journal bush (130) and the pressure shoulder ring (135) with the roll journal (210) of the rolling mill roll for joint rotation therewith;
- a nut (160) screwable on the roll journal for securing the bearing arrangement against an axial displacement; characterized by at least one coupling element (170) for coupling the journal bush (130) to the pressure shoulder ring (135) formed as a screw for providing a screw connection without or only with low stress between the roll journal and the pressure shoulder ring, wherein a screw shaft extends through a bore having a depth in the pressure shoulder ring (135) and is screwed with a threaded portion into the journal bush (135), and the shaft of the screw has a rear portion (174) without a thread extending between the screw head (176) and the threaded portion (172) and having a length (L) which is greater than the depth of the bore in the pressure shoulder ring, wherein the at least one coupling element (170) is not mechanically loaded during a rolling operation.

\* \* \* \* \*